US010449987B2

(12) United States Patent
Gibson

(10) Patent No.: US 10,449,987 B2
(45) Date of Patent: Oct. 22, 2019

(54) TANDEM STROLLER WITH SLIDING CARRIAGE

(71) Applicant: Evenflo Company, Inc., Miamisburg, OH (US)

(72) Inventor: Bryce Gibson, Dedham, MA (US)

(73) Assignee: Evenflo Company, Inc., Miamisburg, OH (US)

( * ) Notice: Subject to any disclaimer, the term of this patent is extended or adjusted under 35 U.S.C. 154(b) by 16 days.

(21) Appl. No.: 15/873,378

(22) Filed: Jan. 17, 2018

(65) Prior Publication Data

US 2019/0217879 A1    Jul. 18, 2019

(51) Int. Cl.
| | |
|---|---|
| *B62B 7/06* | (2006.01) |
| *B62B 9/12* | (2006.01) |
| *B62B 9/28* | (2006.01) |
| *B62B 7/14* | (2006.01) |
| *B62B 7/00* | (2006.01) |
| *B62B 7/12* | (2006.01) |

(52) U.S. Cl.
CPC .............. *B62B 7/142* (2013.01); *B62B 7/008* (2013.01); *B62B 7/06* (2013.01); *B62B 9/12* (2013.01); *B62B 9/28* (2013.01); *B62B 7/12* (2013.01); *B62B 7/145* (2013.01); *B62B 2206/06* (2013.01)

(58) Field of Classification Search
CPC ........... B62B 7/008; B62B 7/06; B62B 7/142; B62B 7/145; B62B 9/12; B62B 9/28
See application file for complete search history.

(56) References Cited

U.S. PATENT DOCUMENTS

| | | | |
|---|---|---|---|
| 7,789,402 B2 * | 9/2010 | Saville | B62B 7/123 280/47.38 |
| 7,832,755 B2 | 11/2010 | Nolan et al. | |
| 8,033,554 B2 | 10/2011 | Vieira et al. | |
| 8,231,136 B2 | 7/2012 | Fiore, Jr. | |
| 8,602,441 B2 | 12/2013 | Li | |
| 8,905,427 B2 | 12/2014 | Katz et al. | |
| 8,967,647 B1 | 3/2015 | Bastien | |
| 9,050,987 B2 | 6/2015 | Gower et al. | |
| 8,955,869 B2 | 12/2015 | Zehfuss | |
| D747,669 S | 1/2016 | Cheng | |
| 9,399,477 B2 | 7/2016 | Iftinca et al. | |
| 9,403,550 B2 | 8/2016 | Zehfuss | |
| 9,493,179 B2 | 11/2016 | Refsum | |
| 9,517,787 B2 | 12/2016 | Zehfuss | |
| 9,616,912 B2 | 4/2017 | Haut et al. | |
| 9,637,154 B2 | 5/2017 | Liu | |
| 2010/0140902 A1 * | 6/2010 | Zehfuss | B62B 7/008 280/650 |
| 2013/0087993 A1 * | 4/2013 | Jacquet | A47D 1/004 280/647 |
| 2013/0154241 A1 | 6/2013 | Parkinson et al. | |
| 2015/0159414 A1 | 6/2015 | Sukeforth et al. | |
| 2016/0046315 A1 | 2/2016 | Zehfuss et al. | |

OTHER PUBLICATIONS

US 8,746,731 B2, 06/2014, Zehfuss (withdrawn)

* cited by examiner

*Primary Examiner* — Bryan A Evans
(74) *Attorney, Agent, or Firm* — Baker Hostetler

(57) ABSTRACT

Disclosed herein is a stroller having selectively positionable components that provide selectively configurability between a single seat configuration suitable to support a single seat and a tandem seat configuration suitable to concurrently support two seats.

20 Claims, 16 Drawing Sheets

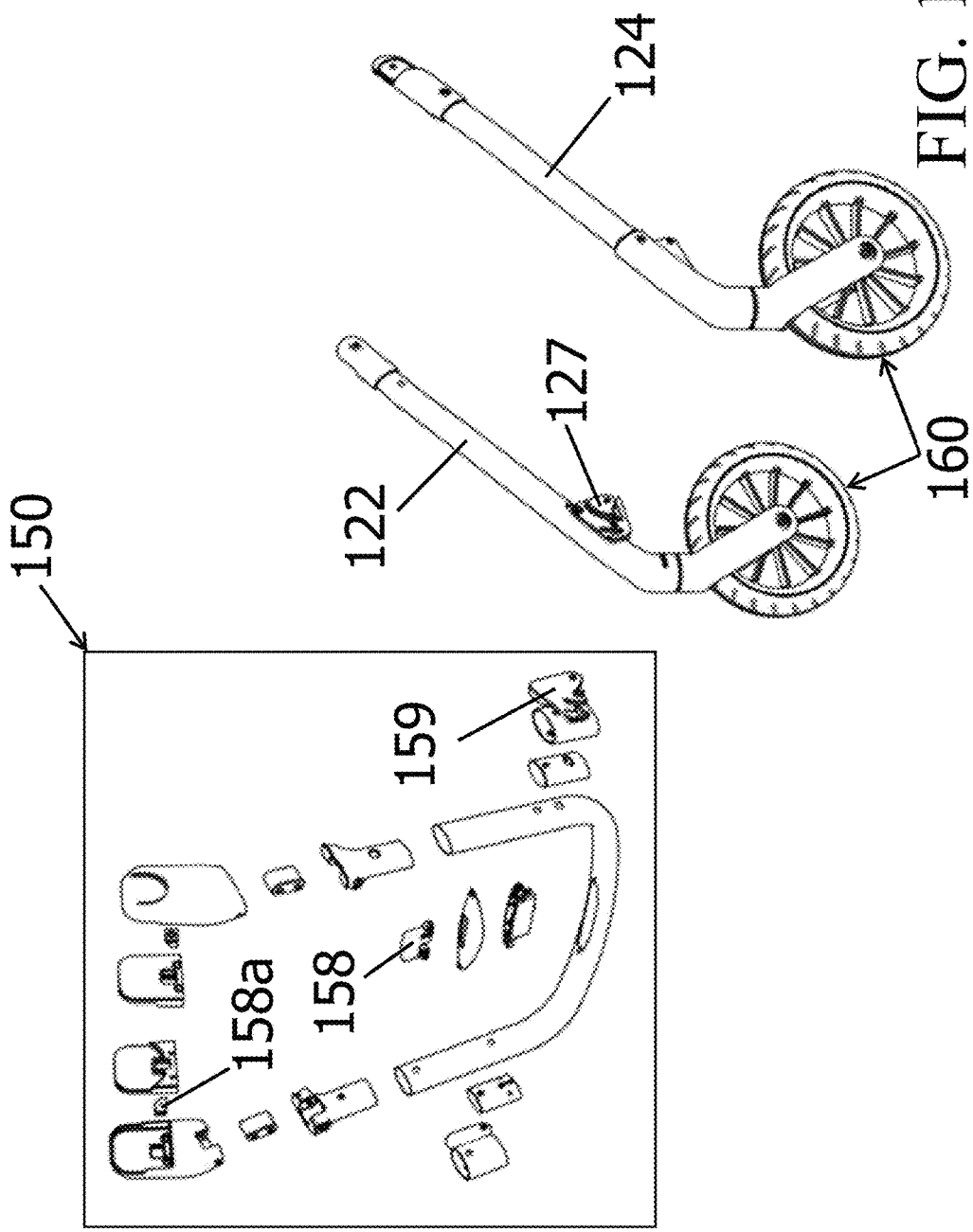

TANDEM STROLLER WITH SLIDING CARRIAGE

TECHNICAL FIELD

The present disclosure relates to strollers. More particularly, the present disclosure relates to modular strollers selectively configurable between a single seat configuration suitable to support a single seat and a tandem seat configuration suitable to concurrently support two seats.

BACKGROUND

Strollers designed to convert from a single seat configuration to a tandem seat configuration are known in the art. Some manufacturers have offered tandem strollers that are not easily configurable to a single seat configuration. Some manufacturers have offered other tandem strollers that position the seats side-by-side or fixed in-line with one another. Such tandem strollers are typically bulky, not easily maneuvered, and do not provide the ability to selectively position the seats to face forward or parent as desired by the user. Further, while some existing strollers can be configured between a single seat and a tandem seat configuration, these strollers typically require time-consuming and complex steps. In fact, with some such strollers, the seats are generally not intended to be removed from the frame during normal use and require the use of special tools or special skills to accomplish the same.

Some other existing strollers accommodate multiple occupants by providing a seat for one occupant and a standing platform or the like for a second occupant. Other strollers provide a seat for a first occupant and a seat for a second occupant that hangs below and behind the first seat. Such strollers present obvious safety concerns and are often uncomfortable. A further disadvantageous to such strollers is that the under-seat storage present in single strollers is reduced by the existence of the second seat, which eliminates or significantly reduces the usable basket or net space for belongings.

It would be desirable to provide a stroller that is selectively configurable between a single seat configuration and a tandem seat configuration, namely such a stroller that provides the same without loss of convenience for the user pushing the stroller. In particular, it would be desirable if selective configuration of the stroller could be accomplished without the need for any special tools or any add-on components, as purchasing and storing such tools or components can be both costly and burdensome. Accordingly, it is desired to provide a stroller having connector components that can be easily moved (e.g., by sliding, rotating, or any other suitable method) to quickly and easily configure a single seat stroller to a tandem seat stroller or vice versa as is desired. It would further be desirable if the connector components were adapted to accommodate a wide variety of seats in multiple orientations as desired.

BRIEF SUMMARY

Disclosed herein are strollers, which may be comprised of a frame and connector components adapted to support one or more seats. The connector components may be adapted to support the seat(s) in selectively releasable attachment therewith. In this way, a single stroller structure may be convertible from a single seat configuration to a tandem seat configuration, such as by performing one or more of the following steps: (a) sliding a connector component(s) upwards relative to the frame so as to position the connector component(s) in position to receive a primary seat thereon, and (b) rotating a lower extension relative to the frame so as to position a connector component(s) located thereon in position to receive a secondary seat thereon. Sliding movement of one or more of the connector components relative to the frame may increase the distance between the connector components, which may thereby provide an acceptable separation between the primary and secondary seats for a myriad of possible configurations (e.g., with one or both of the seats facing forward or one or both of the seats facing rearward toward the user of the stroller).

In accordance with the foregoing, disclosed in exemplary embodiments herein are strollers. In accordance with particular embodiments of the present disclosure, an exemplary stroller comprises: an upper frame portion including first and second side struts spaced apart from each other; a lower frame portion including first and second side struts spaced apart from each other; a pair of primary connector components adapted to support an associated primary seat in selectively releasable attachment therewith, the primary connector components slidably attached to the upper frame portion; and a lower extension including a pair of secondary connector components adapted to support an associated secondary seat in selectively releasable attachment therewith, the lower extension rotatably attached to the lower frame portion.

In certain constructions, the first side strut of the upper frame portion may be foldably connected to the first side strut of the lower frame portion. The second side strut of the upper frame portion may be foldably connected to the second side strut of the lower frame portion.

In accordance with embodiments of the disclosure, each of the primary connector components may be non-releasably attached to the upper frame portion. The lower extension may be non-releasably attached to the lower frame portion.

In certain constructions, a first one of the primary connector components may be slidably attached to the first side strut of the upper frame portion. A second one of the primary connector components may be slidably attached to the second side strut of the upper frame portion.

In accordance with embodiments of the disclosure, the lower extension may include first and second support members spaced apart from each other. The first support member may be rotatably attached to the first side strut of the lower frame portion. The second support member may be rotatably attached to the second side strut of the lower frame portion. A first one of the secondary connector components may be located at a distal end of the first support member. A second one of the secondary connector components may be located at a distal end of the second support member.

In certain constructions, the primary connector components may be positioned at least partially above the secondary connector components. The primary connector components may be positioned at least partially rearward of the secondary connector components.

In accordance with embodiments of the disclosure, the primary connector components may be slidable relative to the upper frame portion between an uppermost position and a lowermost position. Sliding of the primary connector components relative to the upper frame portion between an uppermost position and a lowermost position may selectively vary a distance between the primary connector components and the secondary connector components. The primary connector components may be located proximate a forward end of the upper frame portion when in the lowermost position. The primary connector components may be located between the forward end and a rear end of the upper frame portion when in the uppermost position.

In accordance with particular embodiments of the present disclosure, a modular stroller may be selectively configurable between a single seat configuration and a tandem seat configuration. An exemplary modular stroller comprises: an upper frame portion; a lower frame portion; at least one primary connector component adapted to slide relative to the upper frame portion between a lowermost position in the single seat configuration and an uppermost position in the tandem seat configuration; and a lower extension including at least one secondary connector component, the lower extension adapted to rotate between a folded position in which the lower extension lies directly adjacent and substantially parallel to the lower frame portion and an unfolded position in which the lower extension is angled relative to the lower frame portion and the at least one secondary connector components is oriented upwardly.

In accordance with other particular embodiments of the present disclosure, an exemplary stroller system comprises: a primary seat; a secondary seat; and a stroller, the stroller comprising: an upper frame portion including first and second side struts spaced apart from each other; a lower frame portion including first and second side struts spaced apart from each other; a pair of primary connector components adapted to support the primary seat in selectively releasable attachment therewith, the primary connector components slidably attached to the upper frame portion; and a lower extension including a pair of secondary connector components adapted to support the secondary seat in selectively releasable attachment therewith, the lower extension rotatably attached to the lower frame portion.

In certain constructions sliding movement of the primary connector components relative to the upper frame portion may be retarded when the primary seat is selectively attached to the primary connector components.

Other aspects of the invention may be apparent to those of ordinary skill with review of the attached drawings, appended claims, and additional description.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure is described with additional specificity and detail below through the use of the accompanying drawings.

FIG. 5 illustrates the primary connector components supporting the primary seat in the lowermost position. FIG. 6 illustrates the primary seat releasably detached from the primary connector components. FIG. 7 illustrates the primary connection in the uppermost position with the primary seat releasably detached. FIG. 8 illustrates the primary connector components supporting the primary seat in the uppermost position.

FIG. 16 is an exploded view of the lower extension and the secondary connector components of the stroller of FIG. 1.

DETAILED DESCRIPTION

Figure 1:
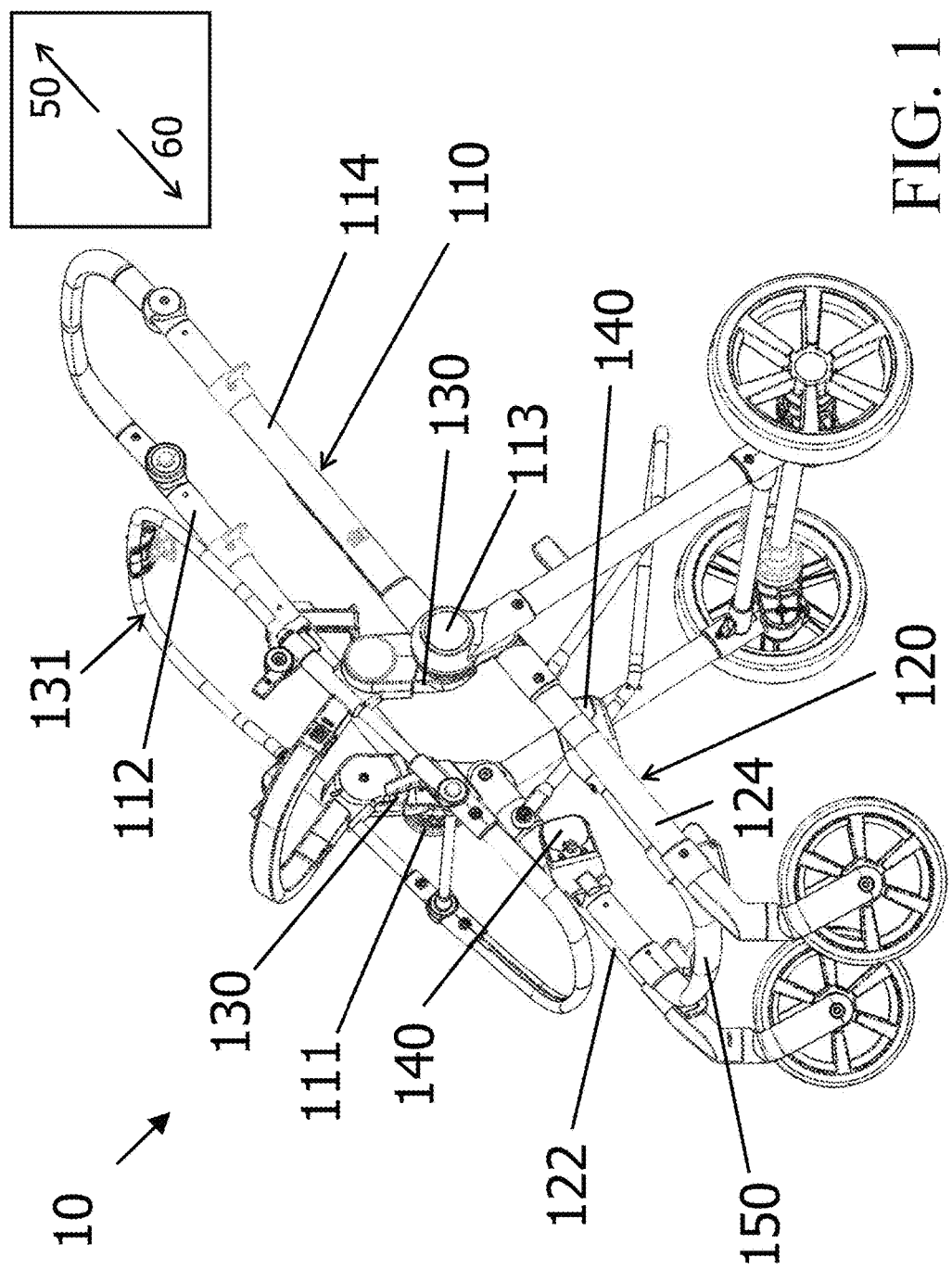
FIG. 1 is a front perspective view of a stroller in a single seat configuration incorporating primary connector components supporting a primary seat in a lowermost position and a lower extension in a folded position in accordance with the disclosure.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The term "parallel" should be construed in its lay sense of two surfaces that maintain a generally constant distance between them, and not in the strict mathematical sense that such surfaces will never intersect when extended to infinity. The terms "operative to" and "adapted to" and similar terms are used herein to describe that a particular component has certain structural features designed to perform a designated function. Such components should be construed as having the expressed structure, with the designated function being considered part of the structure.

As used herein, a component that is "non-releasably attached" to the stroller means the component is designed as permanently attached, such that the component is incapable of being selectively detached by a user without the use of special tools, special skills, or at least partial destruction of the component or the stroller.

In accordance with aspects of the disclosure, exemplary embodiments of strollers and stroller systems are illustrated in various levels of specificity in FIGS. 1-16. Very generally, stroller 10 is designed for safely transporting one or two infants or children. Stroller 10 may be defined by a frame, which frame may include an upper frame portion 110 and a lower frame portion 120. One or more primary connector components 130 may be incorporated into an aspect of the stroller 10. One or more secondary connector components 140 may be incorporated into a lower extension 150 of the stroller 10.

As illustrated in FIGS. 1-4, the frame of the stroller 10 may generally be defined by an upper frame portion 110 and a lower frame portion 120. The upper frame portion 110 may include a first side strut 112 and a second side strut 114. The first and second side struts 112, 114 of the upper frame portion 110 may be spaced apart from each other. The lower frame portion 120 may include a first side strut 122 and a second side strut 124. The first and second side struts 122, 124 of the lower frame portion 120 may be spaced apart from each other.

The first side strut 112 of the upper frame portion 110 may be foldably connected to the first side strut 122 of the lower frame portion 120 (e.g., by a first connection 111). The second side strut 114 of the upper frame portion 110 may be foldably connected to the second side strut 124 of the lower frame portion 120 (e.g., by a second connection 113). In this way, the stroller 10 can be folded about one or more connections between the first side struts of the upper and lower frame portions and the second side struts of the upper and lower frame portions. As will be appreciated by those skilled in the art, the upper and lower frame portions could be foldably connected to one another in a variety of different ways using a variety of different mechanisms. For example, the first and second connections 111, 113 may be, for example, pivoted connections, sliding joints, or the like. In this way, the first side strut 112 of the upper frame portion 110 may be pivotally or slidably connected to the first side strut 122 of the lower frame portion 120 so as to be rotatable and foldable with respect thereto, and second side strut 114 of the upper frame portion 110 may be pivotally or slidably connected to the second side strut 124 of the lower frame portion 120 so as to be rotatable and foldable with respect thereto.

In some embodiments, the stroller may be folded without removal of either of the primary or secondary seats. In other embodiments, removal of the secondary seat may facilitate increased foldability (i.e., a more compact fold) of the stroller or may otherwise be necessary to facilitate full folding of the stroller. Similarly, rotating of the lower extension 150 to the folded position may, in some embodiments, may facilitate increased foldability (i.e., a more compact fold) of the stroller or may otherwise be necessary to facilitate full folding of the stroller.

It is contemplated that the primary seat may not need to be removed in order to fold the stroller. In particular, the stroller may be foldable with the primary seat in either of the lowermost or uppermost positions. In some embodiments, positioning the primary seat in the uppermost position before folding may facilitate increased foldability (i.e., a more compact fold) of the stroller. As will be appreciated by those skilled in the art, the folding of the stroller may decrease the overall size of the stroller, thereby permitting a user to more easily store the stroller (e.g., in the trunk of a vehicle).

The stroller 10 includes one or more primary connector components 130. With reference to FIGS. 1-4, exemplary stroller 10 includes a pair of primary connector components 130. As will be explained in greater detail herein, the primary connector components 130 are slidably attached to the upper frame portion 110 of the stroller 10 so as to be slidable therealong in the direction of arrows 50, 60. When more than one primary connector component 130 is provided, such as pair of primary connector components 130 described herein, each of the primary connector components 130 may be adapted to move independently of all other primary connector components 130 or may alternatively be adapted to move simultaneously with one or more other primary connector components 130.

The primary connector components 130 are adapted to support a primary seat 131 in selectively releasable attachment therewith (see, e.g., FIGS. 1-4). That is, the primary connector components 130 are designed to cooperatively attach the primary seat 131 to the upper frame portion 110, while also permitting the primary seat 131 to be quickly and easily detached without the need for any special tools or time-consuming procedures. That is, the primary seat 131 can be attached and detached from the stroller 10 as desired.

In FIG. 1, the primary seat 131 is illustrated as being releasably attached to the primary connector components 130 such that the primary seat 131 faces forward (i.e., such that an occupant of the primary seat would face away from a user pushing the stroller). It is to be understood, however, that the primary connector components 130 may be designed such that the primary seat 131 may be reversibly attached to the primary connector components 130 in either a forward-facing orientation (FIG. 1) or rear-facing orientation in which the user pushing the stroller would face the occupant of the primary seat.

In FIG. 1, the primary connector components 130 are selectively positioned in a lowermost position along the upper frame portion 110 of the stroller 10. Selective positioning of the primary connector components 130 in the lowermost position may position the primary seat 131 releasably attached thereto substantially centrally on the stroller. As such, selective positioning of the primary connector components 130 in the lowermost position may be preferable when the stroller is desired to be used in a single seat configuration.

The stroller 10 further includes a lower extension 150. As will be explained in greater detail herein, the lower extension 150 is rotatably attached to the lower frame portion 120 of the stroller 10 so as to be rotatable with respect thereto in the direction of arrows 30, 40 (see, e.g., FIG. 3 and FIG. 4).

The lower extension 150 includes one or more secondary connector components 130. With reference to FIGS. 1-4, exemplary stroller 10 includes a pair of secondary connector components 140.

Figure 4:
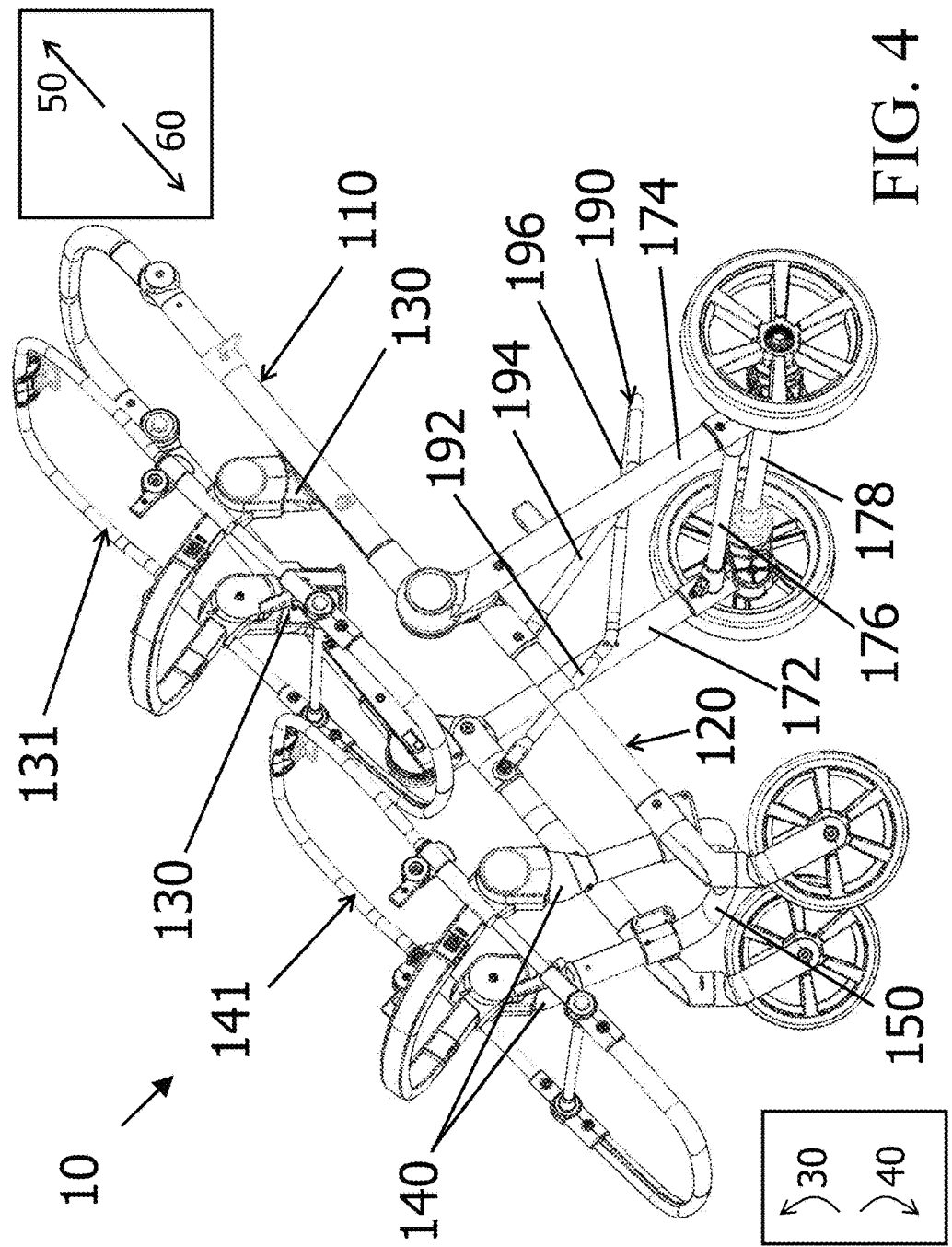
FIG. 4 is a front perspective view of the stroller of FIG. 1 in a tandem seat configuration with the primary connector components supporting the primary seat in the uppermost position and the secondary connector components supporting a secondary seat.

The secondary connector components 140 are adapted to support a secondary seat 141 in selectively releasable attachment therewith (see, e.g., FIG. 4). That is, the secondary connector components 140 are designed to cooperatively attach the secondary seat 141 to the frame, while also permitting the secondary seat 141 to be quickly and easily detached without the need for any special tools or time-consuming procedures. In this way, the secondary seat 141 can be attached and detached from the stroller 10 as desired.

In FIG. 4, the secondary seat 141 is illustrated as being releasably attached to the secondary connector components 140 such that the secondary seat 141 faces forward (i.e., such that an occupant of the primary seat would face away from a user pushing the stroller). It is to be understood, however, that the secondary connector components 140 may be designed such that the secondary seat 141 may be reversibly attached to the secondary connector components 140 in either a forward-facing orientation (FIG. 4) or rear-facing orientation in which the user pushing the stroller would face the occupant of the secondary seat.

In FIG. 1, lower extension 150 is illustrated in the folded position. As will be explained in greater detail herein, the lower extension 150 may be positioned such that it lies directly adjacent and substantially parallel to the first and second side struts 122, 124 of the lower frame portion 120 of the stroller 10 (i.e., in the direction of arrows 50, 60). As a result, each of the secondary connector components 140 may likewise be positioned directly adjacent and along respective ones of the first and second side struts 122, 124 of the lower frame portion 120 of the stroller 10.

Exemplary stroller 10 is illustrated in FIG. 1 with the primary connector components 130 in the lowermost position and the lower extension 150 in the folded position. Such a configuration is referred to herein as a single seat configuration. In the single seat configuration, the stroller may be adapted to receive only a primary seat 131 in selectively releasable attachment to the primary connector components 130. Again, the lower extension 150 may be folded so as to not spatially interfere with the primary seat 131, which may be positioned substantially centrally on the stroller frame. Alternatively, the lower extension may be selectively unfolded in the single seat configuration so as to provide additional space under the primary seat 131, such as to increase the carrying capacity of a net or basket located under the primary seat.

Figure 2:
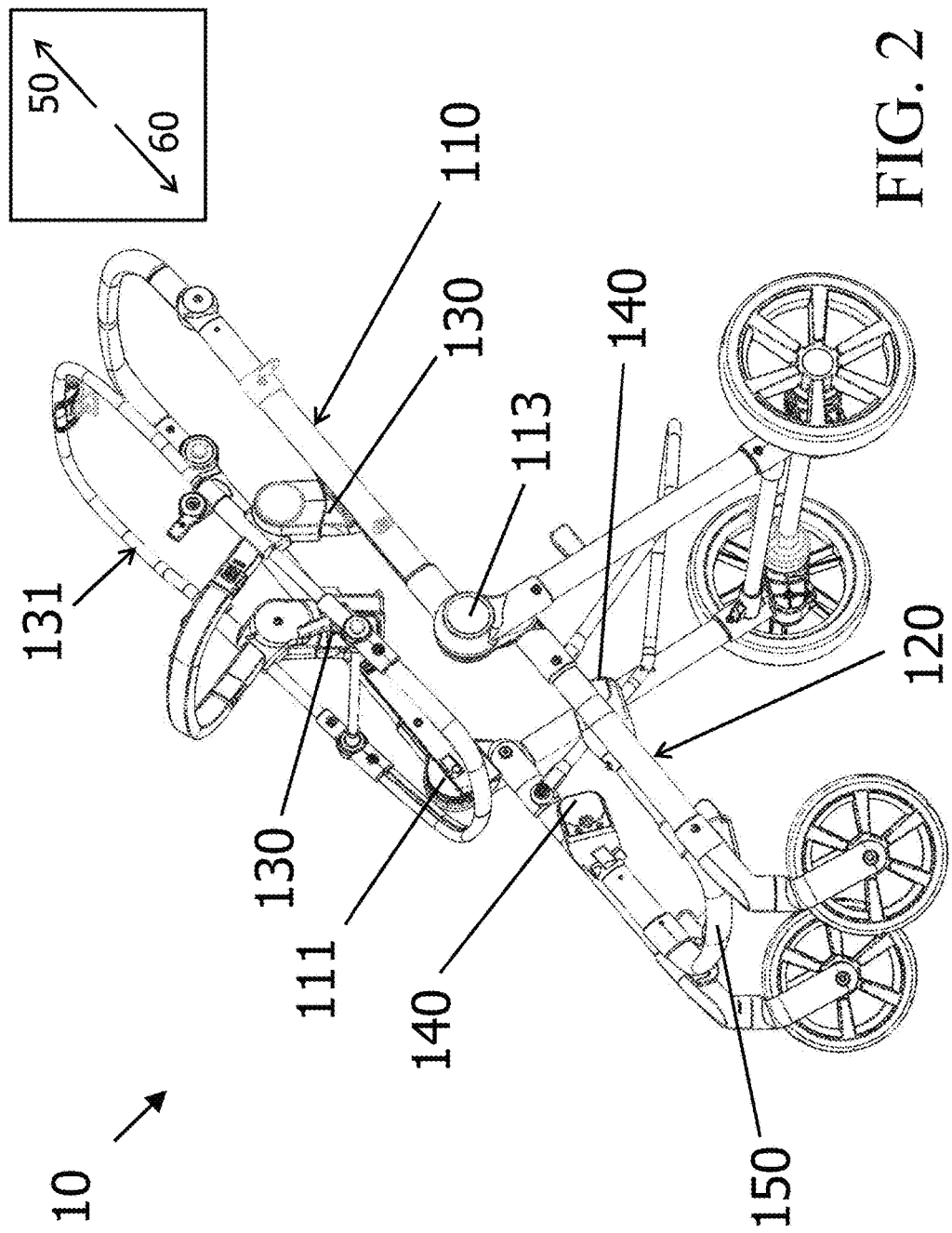
FIG. 2 is a front perspective view of the stroller of FIG. 1 with the primary connector components supporting the primary seat in an uppermost position and the lower extension in a folded position.

With reference now to FIG. 2, it may be seen that the primary connector components 130 have been slid along the upper frame portion 110 of the stroller (i.e., in the direction of arrow 50) so as to selectively position the primary connector components 130 in an uppermost position along the upper frame portion 110 of the stroller 10. Selective positioning of the primary connector components 130 in the uppermost position may position the primary seat 131 releasably attached thereto nearer to the upper end of the stroller than when the primary connector components 130 are in the lowermost position.

The distance between the primary connector components 130 and the secondary connector components 140 may be varied by sliding the primary connector components 130 between the uppermost position and the lowermost position. In particular, sliding the primary connector components 130 up the upper frame portion 110 of the stroller 10 (i.e., in the direction of arrow 50) may increase the distance between the primary connector components 130 and the secondary connector components 140 as compared to when the primary connector components 130 are in the lowermost position. As a result, selective positioning of the primary connector components 130 in the uppermost position may be preferable when the stroller is desired to be used in a tandem seat configuration.

Figure 3:
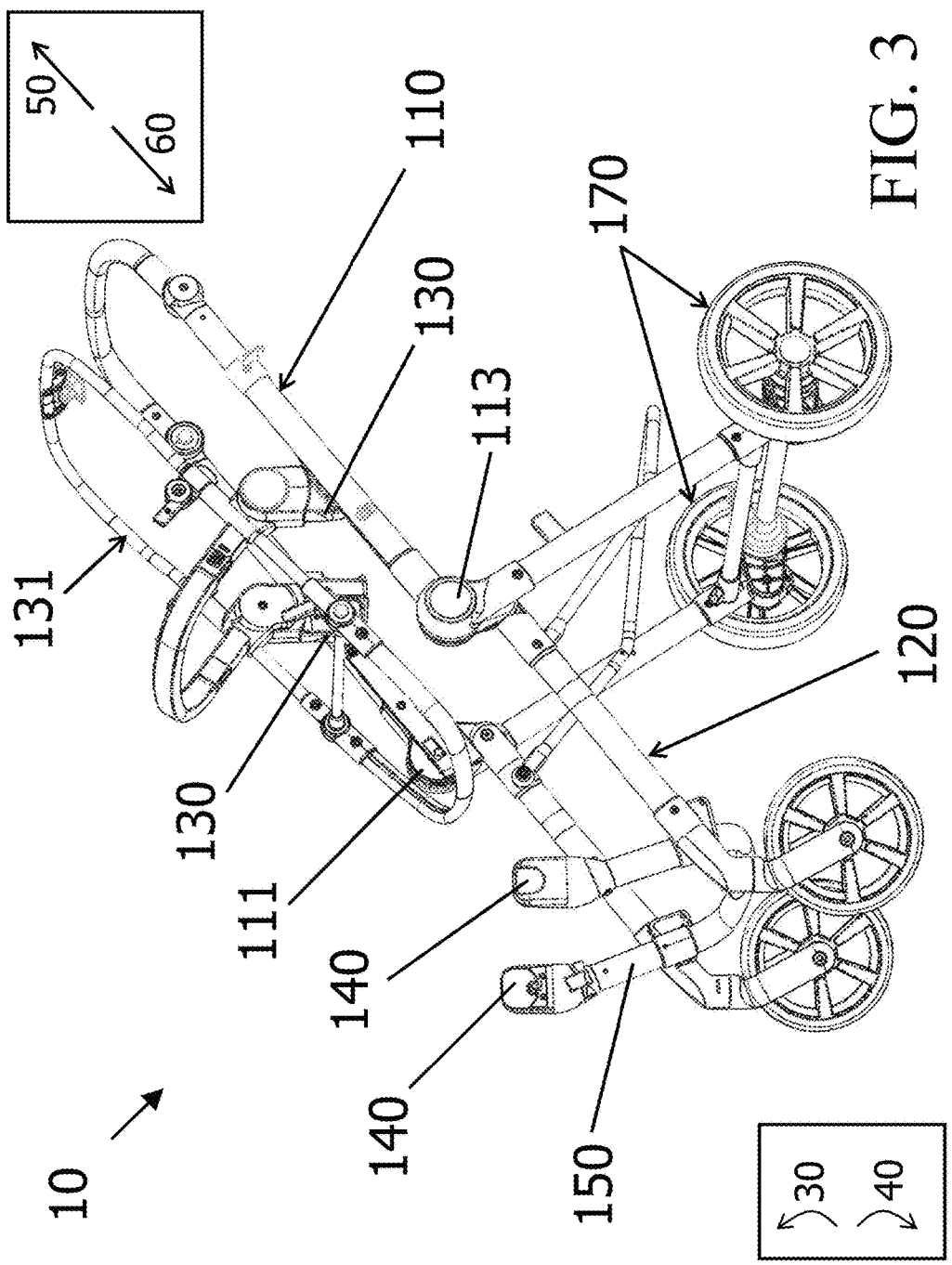
FIG. 3 is a front perspective view of the stroller of FIG. 1 with the primary connector components supporting the primary seat in the uppermost position and the lower extension in an unfolded position such that secondary connector components located thereon are oriented upwardly.

FIG. 3 illustrates the lower extension 150 in the unfolded or upward position. As will be explained in greater detail herein, the lower extension 150 may be positioned so as to be angled relative to the lower frame portion 120 of the stroller 10. In this way, when the lower extension 150 is in the unfolded position, the secondary connector components 130 may be spaced longitudinally apart from the lower frame portion 120 and may be oriented upwardly (i.e., in the direction of arrow 30).

Exemplary stroller 10 is illustrated in FIG. 3 with the primary connector components 130 in the uppermost position and the lower extension 150 in the unfolded position. Such a configuration is referred to herein as a tandem seat configuration. In the tandem seat configuration, the stroller may be adapted to receive both a primary seat 131 in selectively releasable attachment to the primary connector components 130 and a secondary seat 141 in selectively releasable attachment to the secondary connector components 140 of the lower extension 150.

Exemplary stroller 10 is illustrated in FIG. 4 in the tandem seat configuration. In the tandem seat configuration, the primary connector components 130 may be selectively slid along the upper frame portion 110 of the stroller 10 so as to be in the uppermost position. The primary connector components 130 may receive a primary seat 131 in selectively releasable attachment therewith. The lower extension 150 may be selectively rotated relative to the lower frame portion 120 of the stroller 10 so as to be in the unfolded position. The secondary connector components 140 may receive a secondary seat 141 in selectively releasable attachment therewith. In this way, the primary connector components 130 may be positioned at least partially above (i.e., in the direction of arrow 30) and at least partially rearward (i.e., in the direction of arrow 50) of the secondary connector components 140.

Exemplary stroller 10 illustrated in the accompany drawings includes a pair of (i.e., two) primary connector components 130 and a pair of (i.e., two) secondary connector components 140, though it is to be understood that as few or as many primary and secondary connector components can be provided as desired. The number of primary and secondary connector components may generally correspond to the number of complementary mating components on the seats to be used with stroller 10.

The primary and secondary connector components may be any suitable means for selectively releasably attaching the primary and secondary seats to the stroller frame. For example, the primary and secondary seats may each include its own mating components, which may be shaped complementary to respective ones of the primary and secondary connector components of the stroller. The primary and secondary connector components are preferably of the type that is non-releasably attached to the stroller frame or lower extension, respectively. Suitable primary and secondary connector components include, but are not limited to, locking tabs, friction fittings, rotating latches, magnetic components, or the like.

The primary and secondary seats may be of any desired size, shape, or configuration. That is, the primary and secondary connector components may be designed to accommodate selectively releasable attachment with an infant seat, toddler seat, baby seat, bassinet, pram, car seat, baby carrier, any other stroller seat, or the like.

As will be appreciated by those skilled in the art with reference to the accompanying drawings, the stroller may include other components or struts as are customary in the art, such as a basket, net, shade, peek-a-boo window, or parking brake.

With reference again to FIG. 3 and FIG. 4, the lower frame portion 120 of the stroller 10 may include a first rear strut 172 and a second rear strut 174. The first rear strut 172 may be foldably connected (e.g., pivotally or slidably connected) to one or both of the first side struts 112, 122 of the upper and lower frame portions 110, 120 (e.g., by first connection 111). The second rear strut 174 may be foldably connected (e.g., pivotally or slidably connected) to one or both of the second side struts 114, 124 of the upper and lower frame portions 110, 120 (e.g., by second connection 113). One or more crossbars 176, 178 can interconnect the first and second rear struts 172, 174. One or more rear wheels 170 may be provided at the extreme ends of each of the first and second rear struts 172, 174.

With continued reference to FIG. 3 and FIG. 4, a lower strut structure 190 may also be incorporated into an aspect of stroller 10, such as for supporting a carrying basket beneath the seat(s) of the stroller. The lower strut structure 190 may, in certain embodiments, include a first lower strut 192 and a second lower strut 194, one or more of which may be foldably connected (e.g., pivotally or slidably connected) to the lower frame portion 120 of the stroller 10. The strut structure 190 may further include a crossbar 196 interconnecting the first lower strut 192 and the second lower strut 194.

Figure 5:
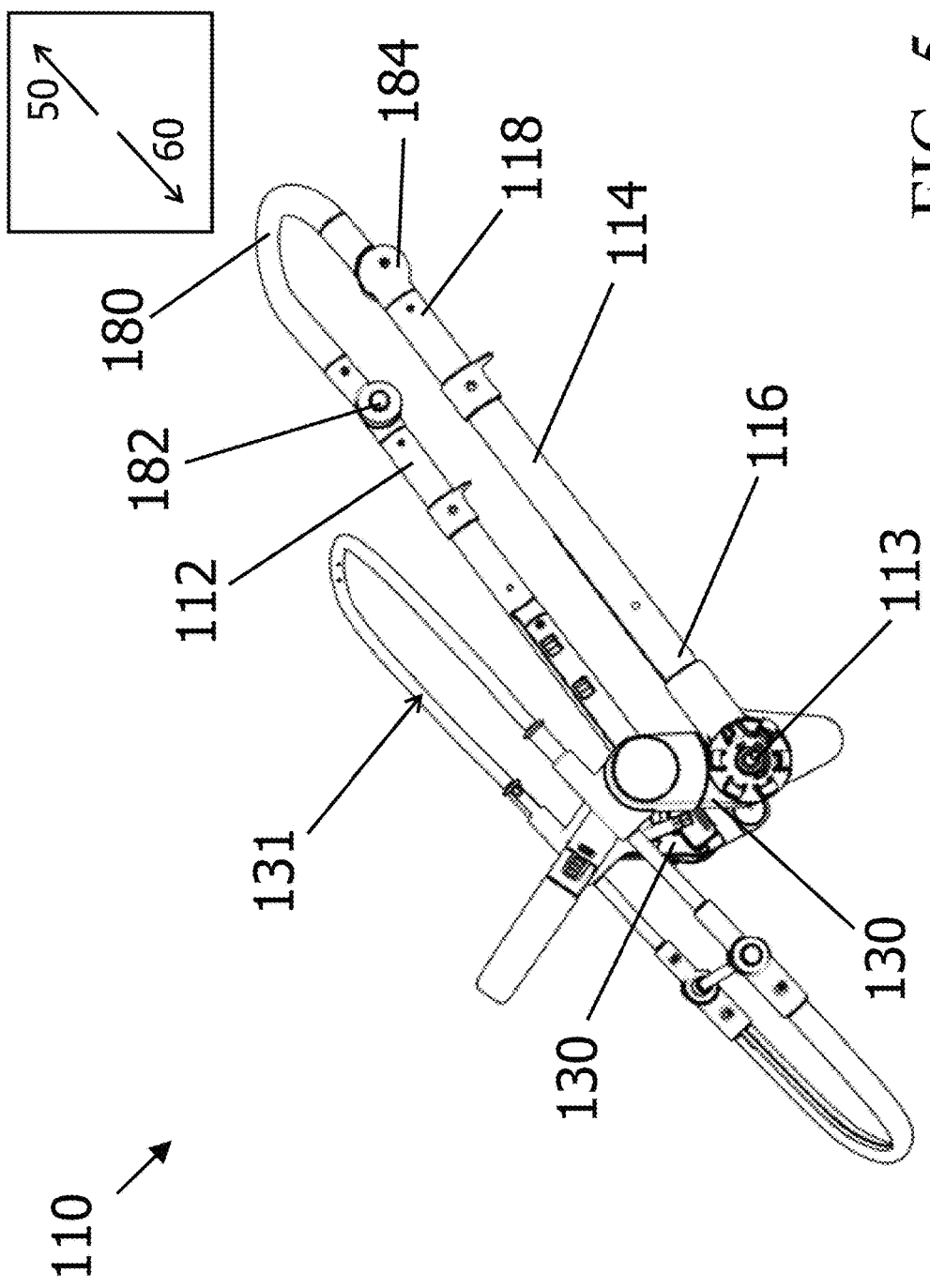
FIGS. 5-8 are side perspective views of the upper frame portion of the stroller of FIG. 1 illustrating movement of the primary seat from its position in the single seat configuration to its position in the tandem seat configuration.

With reference now to FIG. 5, a handle 180 may be provided proximate the first end 118 of the upper frame portion 110 of the stroller 10. The handle 180 can be, for example, a telescoping handle. The handle 180 may, in certain embodiments, be foldably connected (e.g., pivotally or slidably connected) to the upper frame portion 110 of the stroller 10. For example, as shown in FIG. 5, the handle 180 may be foldably connected to the first side strut 112 of the upper frame portion 110 (e.g., by connection 182) and may be foldably connected to the second side strut 114 of the upper frame portion 110 (e.g., by connection 184).

FIGS. 5-8 illustrate how the primary connector components 130 may be selectively slid along the upper frame portion 110 of the stroller 10 (i.e., in the direction of arrows 50, 60) so as to selectively position the primary connector components 130 in the uppermost or lowermost position.

Again, a pair of primary connector components 130 is illustrated. One (e.g., a first one of the illustrated pair) of the primary connector components 130 may be slidably attached to the first side strut 112 of the upper frame portion 110. Another (e.g., a second one of the illustrated pair) of the primary connector components 130 may be slidably attached to the second side strut 114 of the upper frame portion 110.

In certain constructions, each of the primary connector components 130 may preferably be non-releasably attached to the upper frame portion 110. That is, one (e.g., a first one of the illustrated pair) of the primary connector components 130 may preferably be slidably and non-releasably attached to the first side strut 112 of the upper frame portion 110, and another (e.g., a second one of the illustrated pair) of the primary connector components 130 may preferably be slidably and non-releasably attached to the second side strut 114 of the upper frame portion 110.

In FIG. 5, the primary connector components 130 are selectively positioned in the lowermost position with the primary seat 131 releasably attached thereto. In the lowermost position, the primary connector components 130 may be located proximate a forward end 116 of the upper frame portion 110. In this way, FIG. 5 shows the upper frame portion 110 of the stroller in the single seat configuration.

The primary connector components 130 are designed so as to be slidable relative to the upper frame portion 110. In particular, the primary connector components 130 may be slidable toward a rear end 118 of the upper frame portion 110 (i.e., in the direction of arrow 50) as desired. Similarly, the primary connector components 130 may be slidable toward the forward end 116 of the upper frame portion 110 (i.e., in the direction of arrow 60) as desired.

Figure 7:
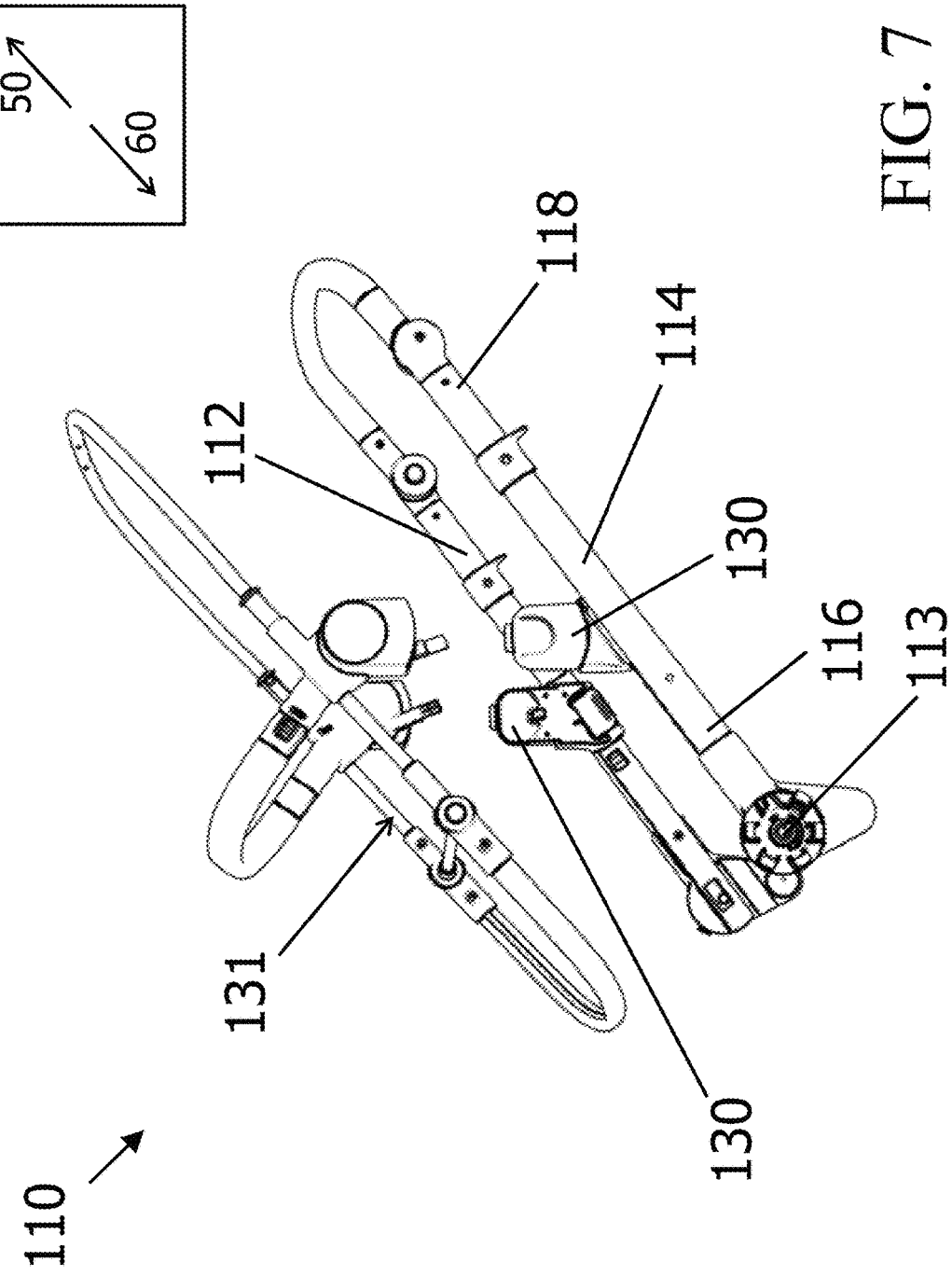

When the primary seat 131 is attached to the primary connector components 130, such as is illustrated in FIG. 5 and FIG. 7, movement of the primary connector components 130 relative to the upper frame portion 110 may be prevented or retarded. Limiting or preventing movement of the primary connector components 130 relative to the upper frame portion 110 when the primary seat 131 is attached to the primary connector components 130 may thereby prevent or retard undesired movement of the primary seat 131 and any occupant therein, such as by another occupant of the stroller. This may aid in ensuring the safety of an occupant or any items placed in the primary seat by limiting or preventing the primary seat from undesired movement relative to the upper frame portion 110.

Put another way, the stroller may be designed, adapted, or configured such that movement of the primary connector components 130 relative to the upper frame portion 110 can only be effected when no seat is attached thereto. For purposes of further clarification, due to the attachment of the primary seat 131 to the primary connector components 130 in FIG. 5, movement of the primary connector components 130 may not be possible in FIG. 5.

Figure 6:
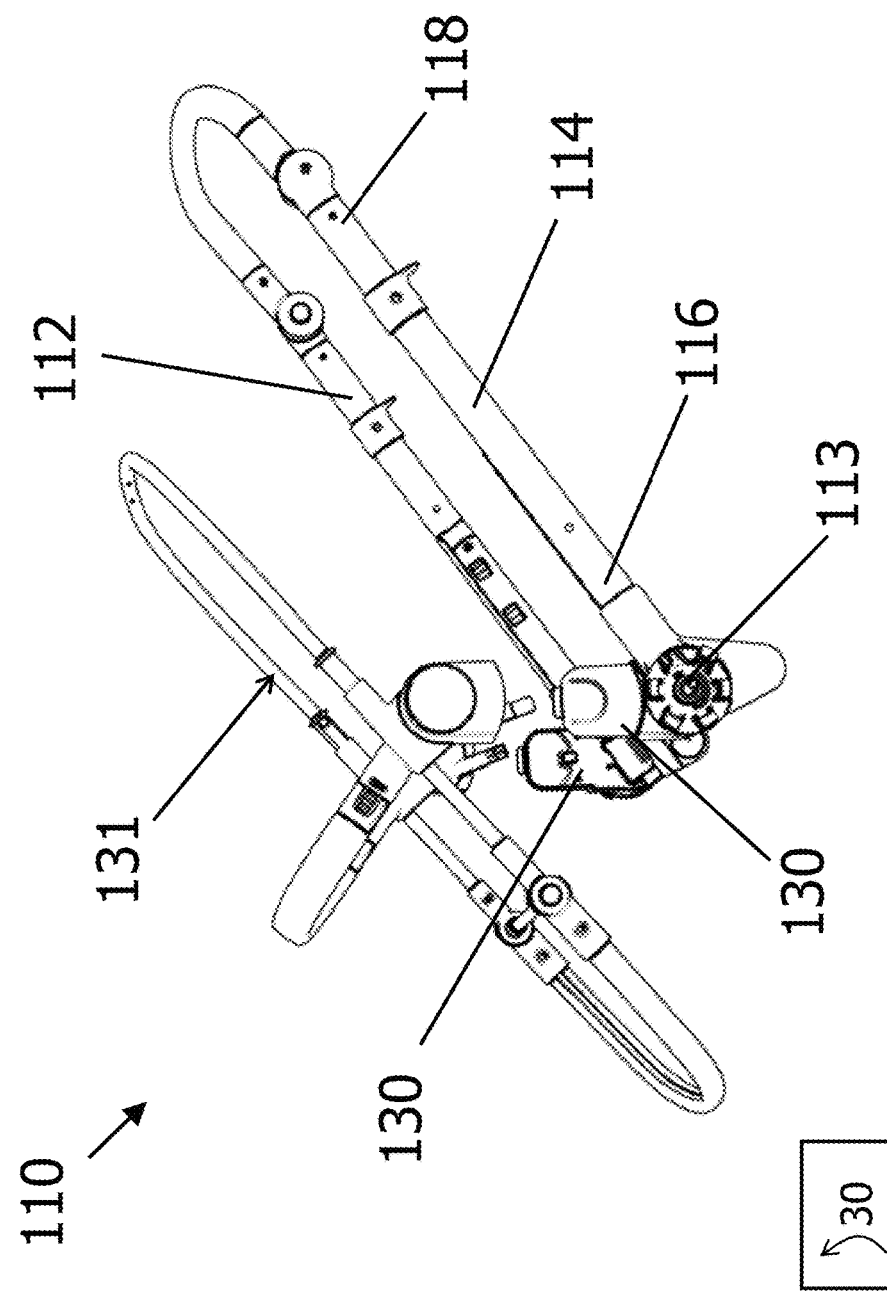

In FIG. 6, the primary seat 131 has been selectively detached from the primary connector components 130, which remain selectively positioned in the lowermost position. As explained above, with the primary seat 131 selectively detached, the primary connector components 130 may now be slid along the upper frame portion 110 from the lowermost position to the uppermost position (i.e., in the direction of arrow 50).

In FIG. 7, the primary connector components 130 have been slid along the upper frame portion 110 (i.e., in the direction of arrow 50) and are now selectively positioned in the uppermost position. In the uppermost position, the primary connector components 130 may be located further from the forward end 116 and closer to the rear end 118 of the upper frame portion 110 than when in the lowermost position (compare FIG. 5 and FIG. 7). Put another way, in the uppermost position, the primary connector components 130 may be located between the forward end 116 and the rear end 118 of the upper frame portion 110. In FIG. 7, the primary seat 131 remains detached and is now positioned above the primary connector components 130 and is ready for attachment thereto.

Figure 8:
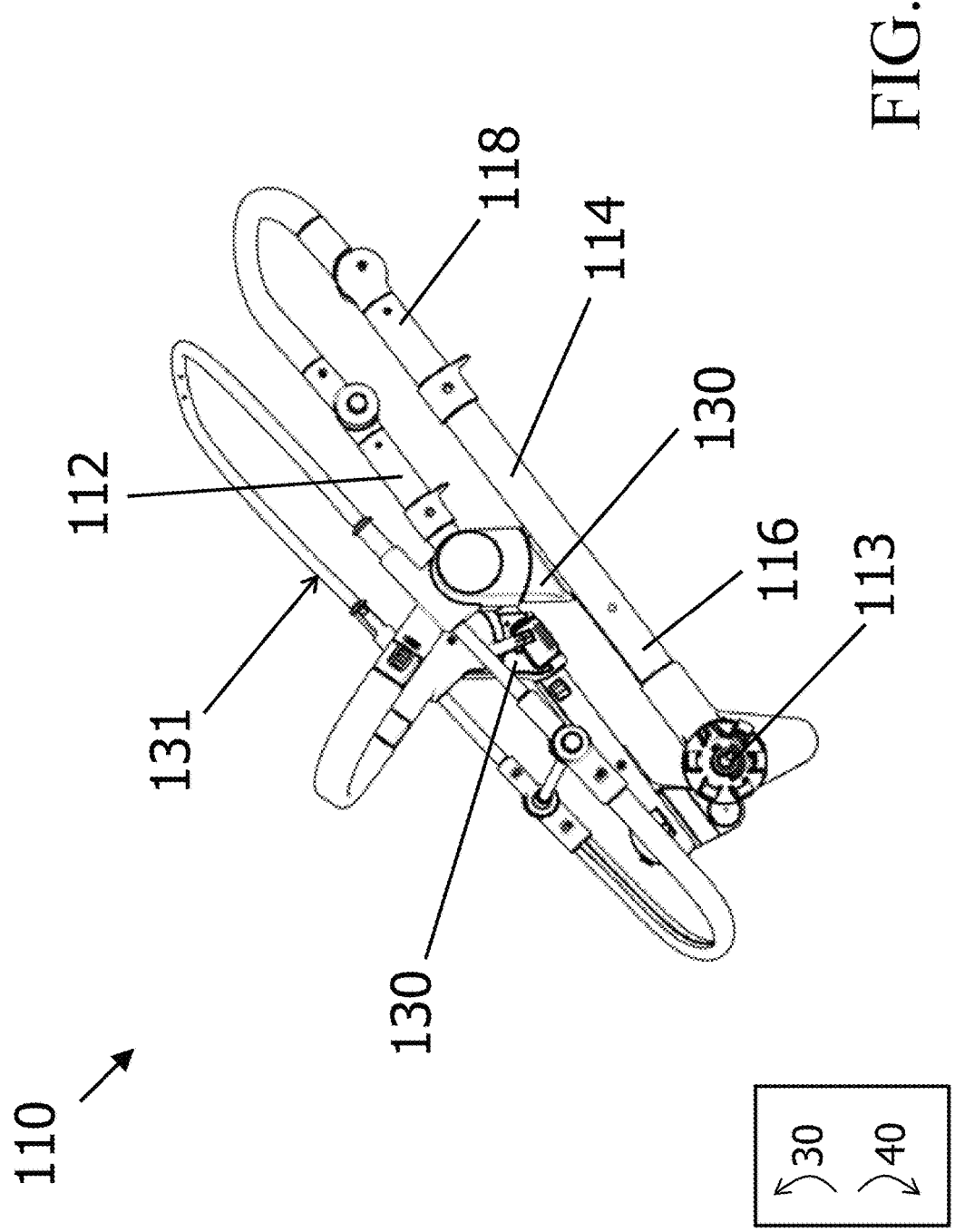

In FIG. 8, the primary seat 131 has been selectively reattached to the primary connector components 130, which remain selectively positioned in the uppermost position. In this way, FIG. 8 shows the upper frame portion 110 of the stroller in the tandem seat configuration.

As explained above, with the primary seat 131 selectively attached to the primary connector components 130, movement of the primary connector components 130 relative to the upper frame portion 110 may be prevented or retarded. For purposes of further clarification, due to the attachment of the primary seat 131 to the primary connector components 130 in FIG. 8, movement of the primary connector components 130 may not be possible in FIG. 8.

Figure 9:
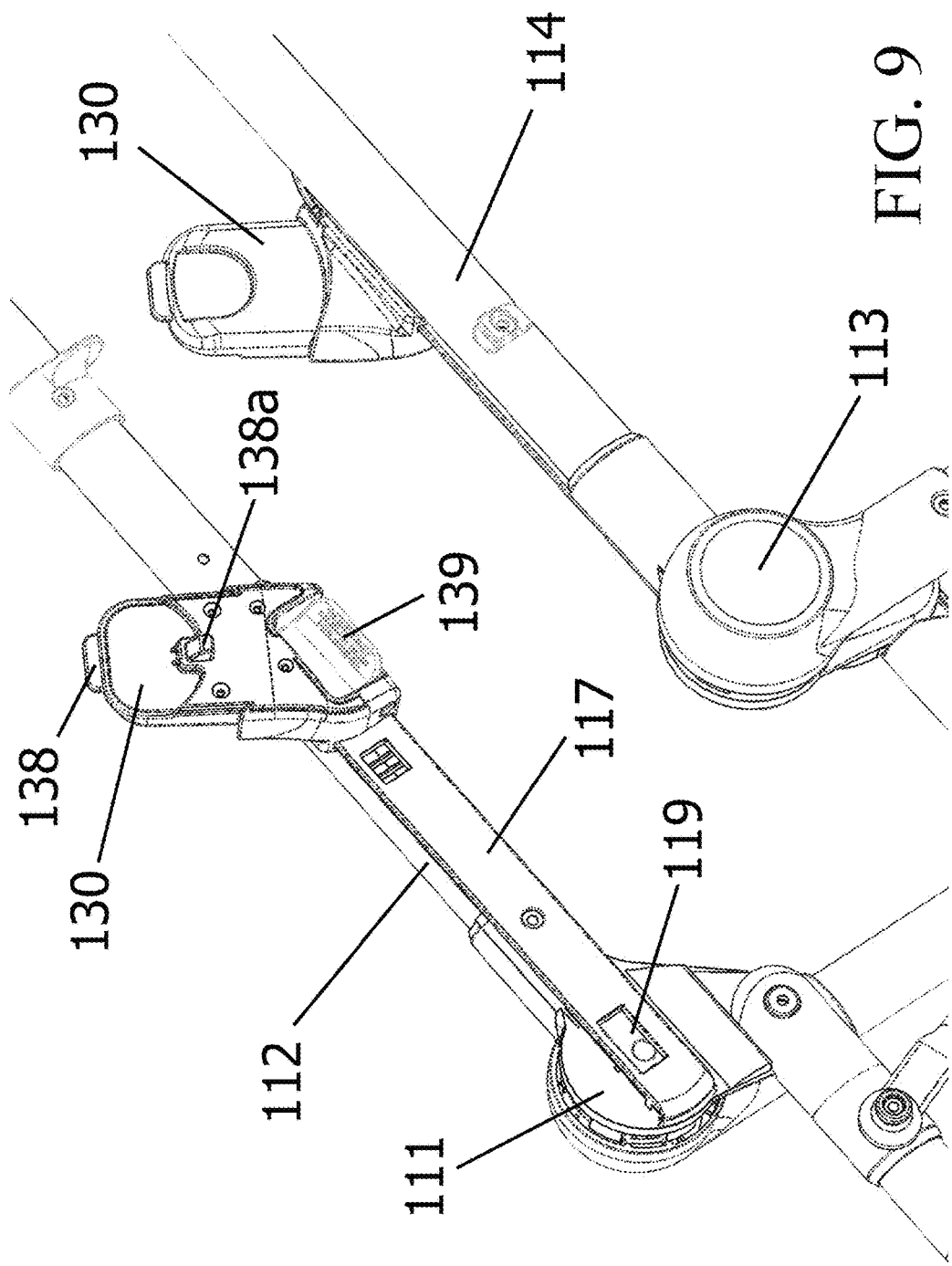
FIG. 9 is a perspective view of the upper frame portion of the stroller of FIG. 1 with the primary seat removed.
Figure 10:
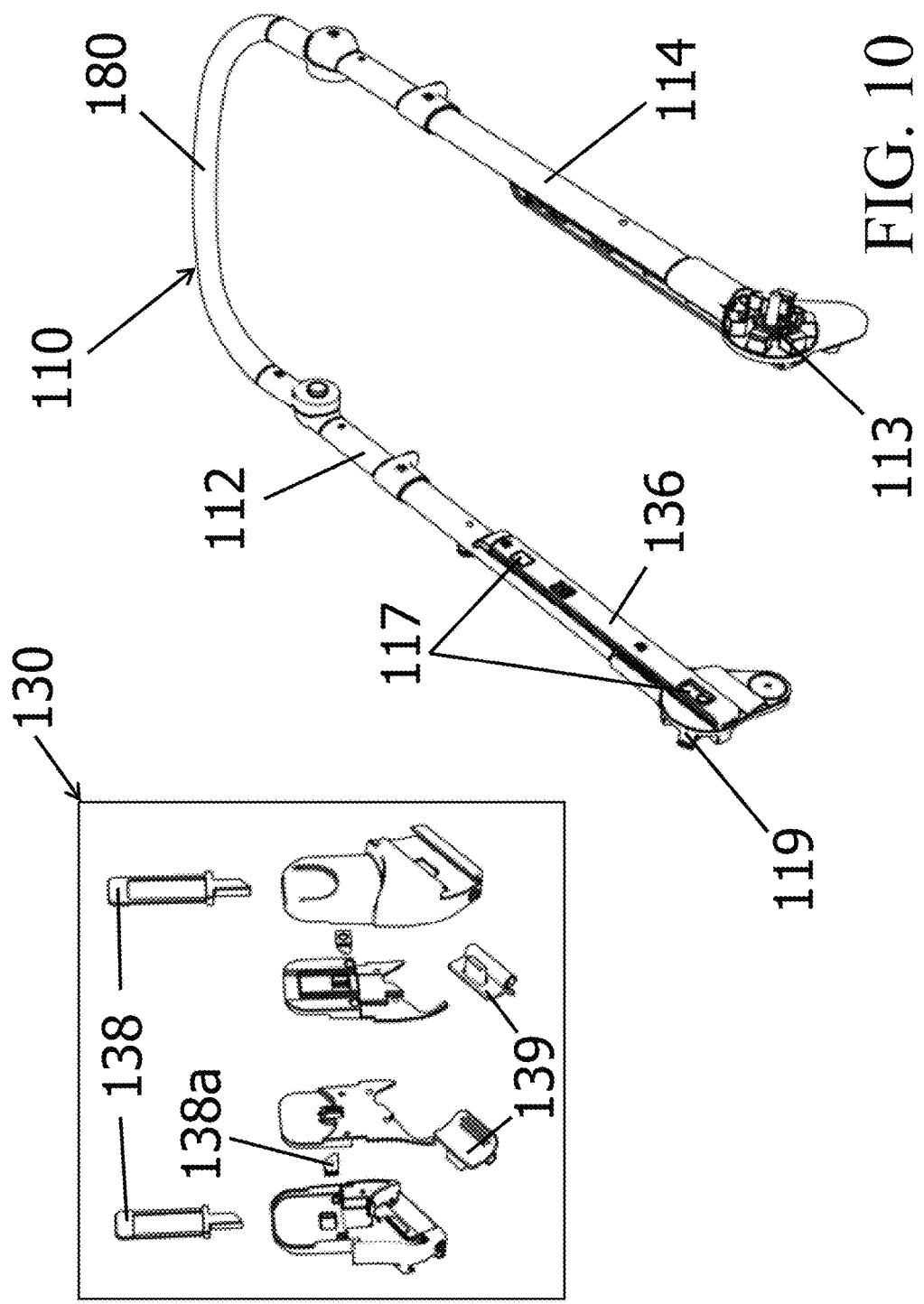
FIG. 10 is an exploded view of the primary connector components of the stroller of FIG. 1.

FIG. 9 and FIG. 10 illustrate the mechanisms that may effectuate movement of the primary connector components 130 relative to the upper frame portion 110. For purposes of clarity, only the workings of the first side strut 112 of the upper frame portion 110 and of the primary connector component 130 attached thereto are labeled or described. However, it is to be understood that each of the first and second side struts 112, 114 of the upper frame portion may be similarly designed. Likewise, it is to be understood that each of the primary connector components 130 may be similarly designed.

Each side strut of the upper frame portion 110 may include a track 117 running therealong (i.e., in the direction of arrows 50, 60) between the lowermost and uppermost positions. The primary connector components 130 may be designed so as to cooperative engage with respective ones of the tracks 117. In particular, the primary connector components 130 may be adapted for sliding movement along the tracks 117. Each track 117 may include one or more stops 119. Generally, each track 117 may include at least two stops 119, with one stop corresponding to the lowermost position and another stop corresponding to the uppermost position. The stops 119 can, for example, be designed as notches in the track 117.

As a primary connector component 130 is slid along a respective track 117, an engagement tab 139 of the primary connector component 130 may cooperatively engage with one of the stops 119 in the track. In this way, the engagement tab 139 of the primary connector component 130 may selectively lock the primary connector component 130 into one of the lowermost and uppermost positions. In particular, downward compressive force on the engagement tab 139 may be adapted to effect movement of at least a portion of the engagement tab 139 into a desired one of the stops 119 in the track 117 so as to cause the primary connector component 130 to be selectively positioned at a desired one of the uppermost and lowermost positions. For example, FIG. 9 shows the primary connector component 130 attached to first side strut 112 engaging with the track 117 thereof so as to selectively position the primary connector component 130 in the uppermost position.

Each primary connector component 130 may further be provided with a button 138. The button 138 may be cooperatively connected to a locking tab 138a designed to keep the primary connector component 130 in attachment with a primary seat 131 placed upon the primary connector component 130 (see, e.g., FIGS. 5-8). For example, downward compressive force on the button 138 may be adapted to effect inward compressive movement of the locking tab 138a, so as to cause a primary seat 131 attached to the primary connector component 130 to be selectively detached therefrom.

As previously explained, preventing or retarding movement of the primary connector components 130 when the primary seat 131 is attached thereto may aid in ensuring that an occupant of the primary seat remains safe and is not undesirably moved. In particular, the primary connector components 130 may be designed, adapted, or configured such that movement of the primary connector components 130 relative to the upper frame portion 110 can only be effected when no seat is attached thereto. For example, the button 138 may be designed such that, when compressed (e.g., when a seat is attached to the primary connector component 130), the primary connector component 130 is prevented from being moved. Compression of the button 138 may, for example, prevent the engagement tab 139 from being depressed, rotated, or otherwise disengaged, which may be necessary to effect sliding movement of the primary connector component 130 relative to the upper frame portion 110.

FIGS. 11-14 illustrate how the lower extension 150 may be selectively rotated relative to the lower frame portion 120 of the stroller 10 (i.e., in the direction of arrows 30, 40) so as to selectively position the lower extension 150 in the folded or unfolded position.

The lower extension 150 may include a first support member 152 and a second support member 154. The first support member 152 may be rotatably attached to the first side strut 122 of the lower frame portion 120. The second support member 154 may be rotatably attached to the second side strut 124 of the lower frame portion 120. The first and second support members 152, 154 may be rotatably attached to the first and second side struts 122, 124 of the lower frame portion 120, respectively, between the upper and lower ends 126, 128 of the lower frame portion 120. In particular embodiments, the first and second support members 152, 154 may be rotatably attached to the first and second side struts 122, 124 of the lower frame portion 120, respectively, closer to the lower end 128 of the lower frame portion 120 than to the upper end 126 thereof, such as is illustrated in FIGS. 11-14.

In certain constructions, the lower extension 150 may preferably be non-releasably attached to the lower frame portion 120. That is, the first support member 152 of the lower extension 150 may preferably be rotatably and non-releasably attached to the first side strut 122 of the lower frame portion 120, and the second support member 154 of the lower extension 150 may preferably be rotatably and non-releasably attached to the second side strut 124 of the lower frame portion 120.

The lower extension 150 may further include a crossbar 153 running between and interconnecting the first side strut 152 and the second side strut 154. That is, the lower extension 150 may be substantially U-shaped.

Again, the lower extension 150 includes a pair of secondary connector components 140. One (e.g., a first one of the illustrated pair) of the secondary connector components 140 may be located at a distal end of the first support member 152 of the lower extension 150. Another (e.g., a second one of the illustrated pair) of the secondary connector components 140 may be located at a distal end of the second support member 154 of the lower extension 150.

Figure 11:
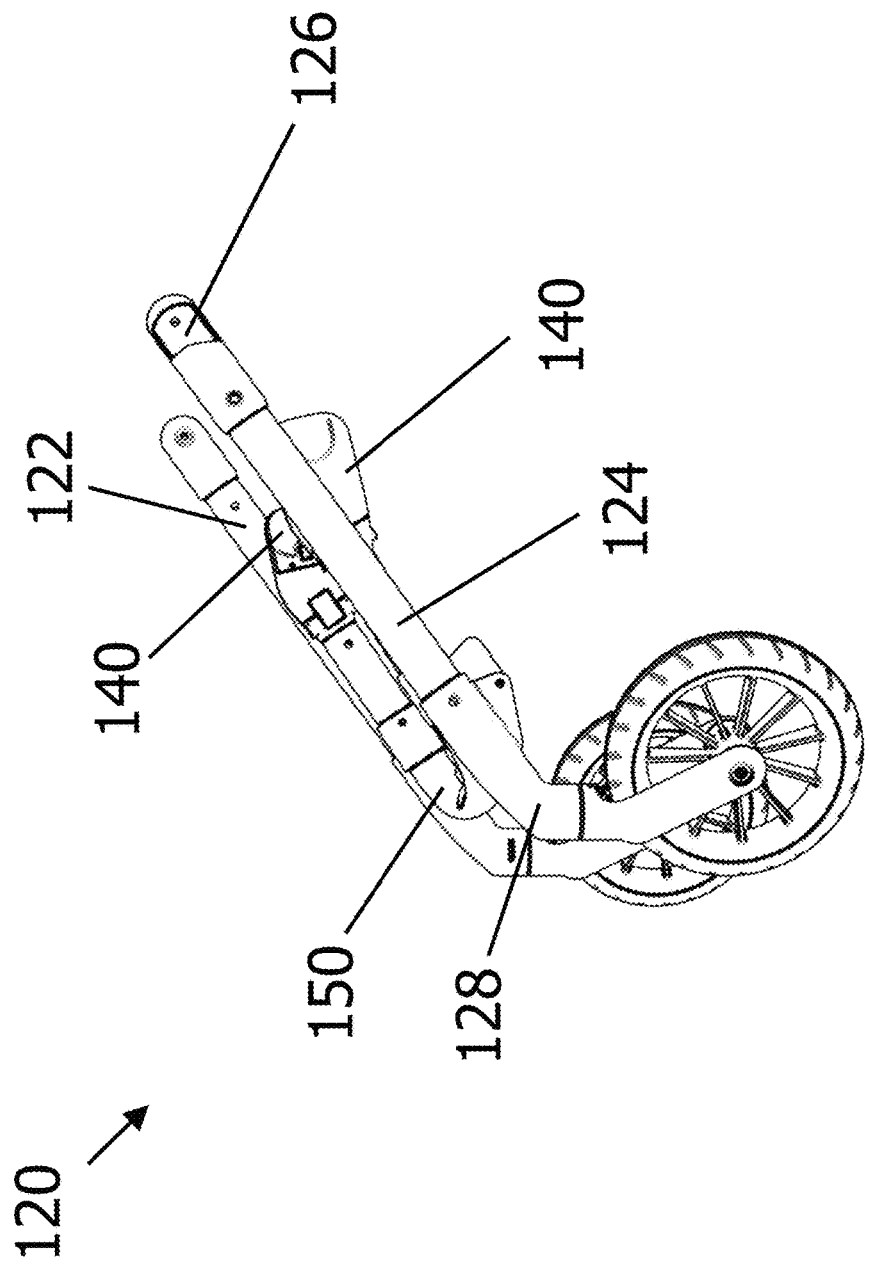
FIG. 11 is a side perspective view of the lower frame portion of the stroller of FIG. 1 with the lower extension rotated to a folded position such that the lower extension lies directly adjacent and substantially parallel to the lower frame portion.
Figure 12:
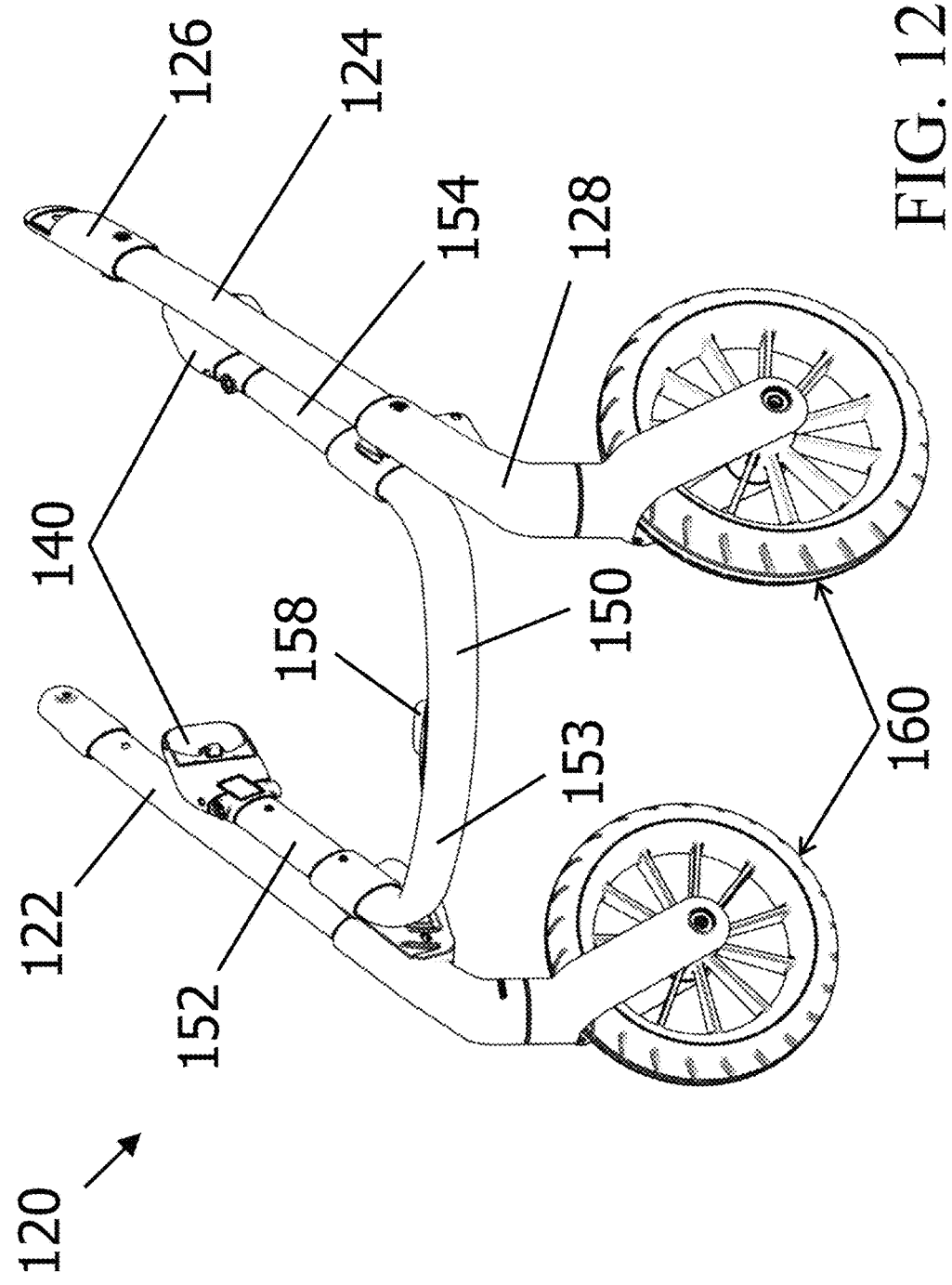
FIG. 12 is a front perspective view of the lower frame portion of the stroller of FIG. 1 with the lower extension rotated to a folded position such that the lower extension lies directly adjacent and substantially parallel to the lower frame portion.

In FIG. 11 and FIG. 12, the lower extension 150 is selectively positioned in the folded position. In the folded position, the lower extension 150 may be positioned so as to lie directly adjacent and substantially parallel to the first and second side struts 122, 124 of the lower frame portion 120 of the stroller 10 (i.e., in the direction of arrows 50, 60). As a result, each of the secondary connector components 140 may likewise be positioned directly adjacent and along respective ones of the first and second side struts 122, 124 of the lower frame portion 120 of the stroller 10. In this way, FIG. 11 and FIG. 12 show the lower frame portion 120 of the stroller in the single seat configuration.

One or more front wheels 160 may be provided at the extreme end of each of the first and second side struts 122, 124 of the lower frame portion 100 of the stroller 10 (e.g., proximate the forward end 128 of the lower frame portion 100), such as is illustrated in FIG. 12.

Figure 13:
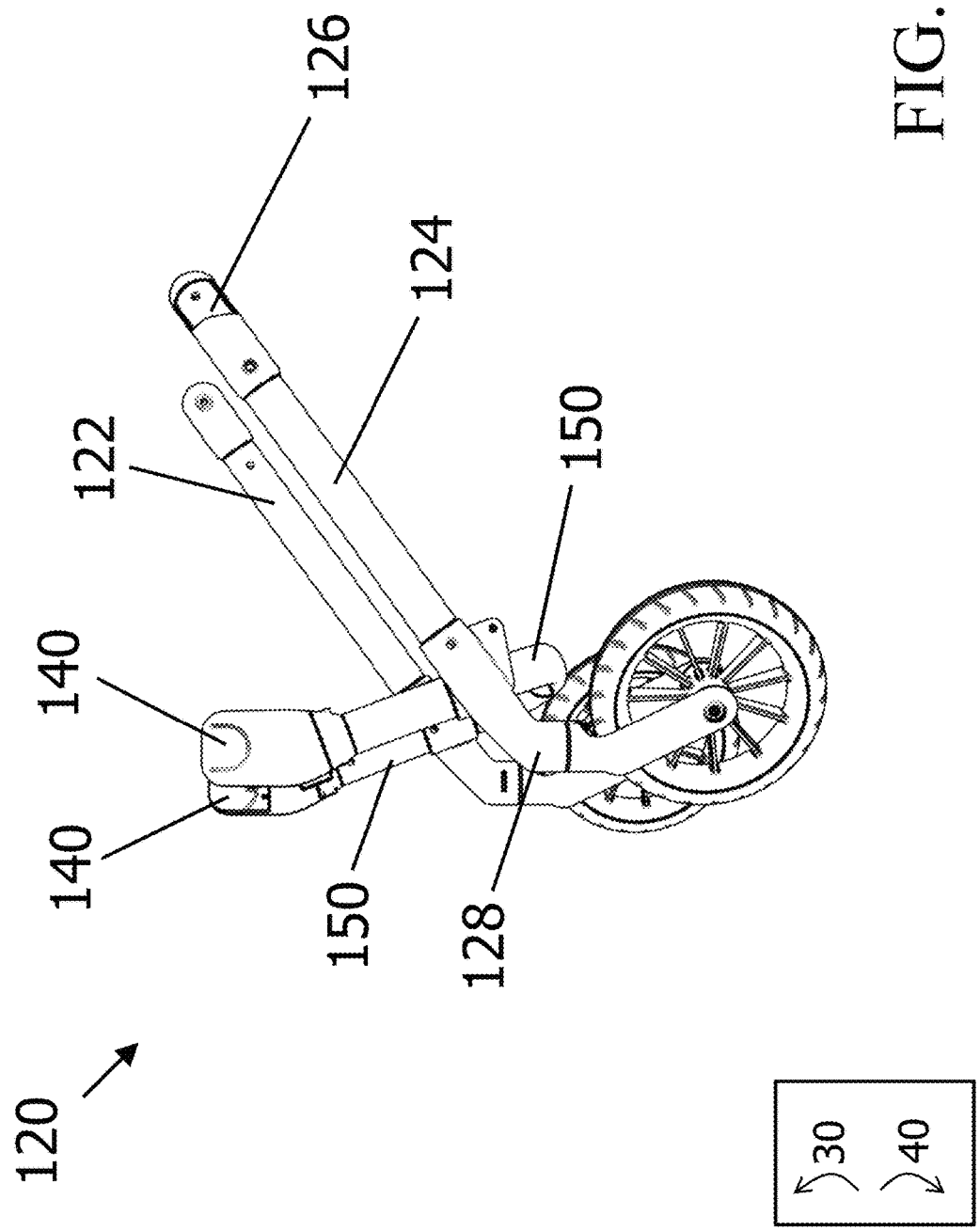
FIG. 13 is a side perspective view of the lower frame portion of the stroller of FIG. 1 with the lower extension rotated to an unfolded position such that the lower extension is angled relative to the lower frame portion and the secondary connector components are oriented upwardly.
Figure 14:
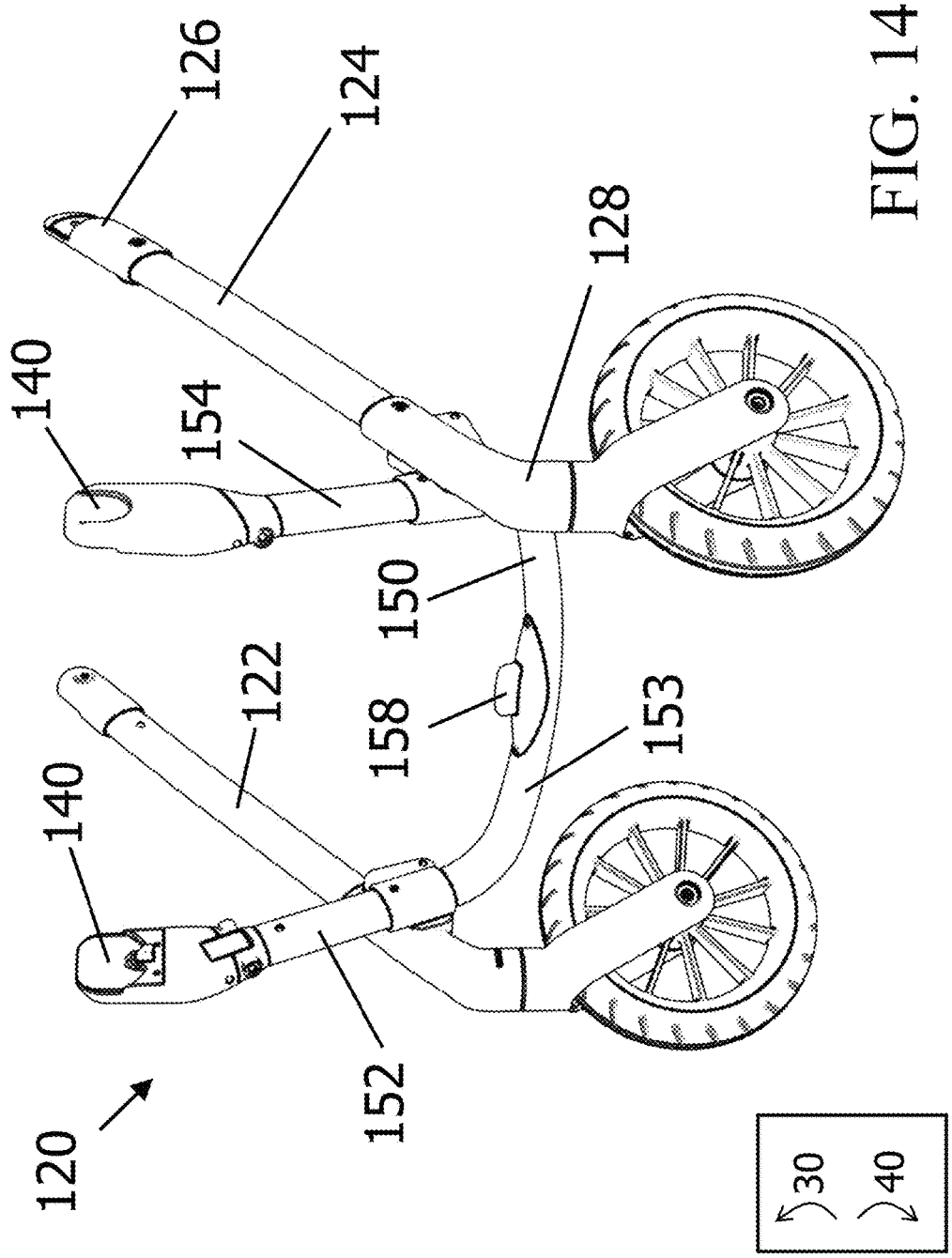
FIG. 14 is a front perspective view of the lower frame portion of the stroller of FIG. 1 with the lower extension rotated to an unfolded position such that the lower extension is angled relative to the lower frame portion and the secondary connector components are oriented upwardly.

In FIG. 13 and FIG. 14, the lower extension 150 is selectively positioned in the unfolded or upward position. In the unfolded position, the lower extension 150 may be positioned so as to be angled relative to the lower frame portion 120 of the stroller 10. As a result, each of the secondary connector components 140 may be positioned so as to be longitudinally spaced apart from the lower frame portion 120 of the stroller 10 and oriented upwardly (i.e., in the direction of arrow 30). In this way, FIG. 11 and FIG. 12 show the lower frame portion 120 of the stroller in the tandem seat configuration. That is, the secondary connector components 140 are ready to receive a secondary seat in selectively releasable attachment therewith (see FIG. 4, which illustrates secondary seat 141 in selectively releasable attachment with the secondary connector components 140).

Figure 15:
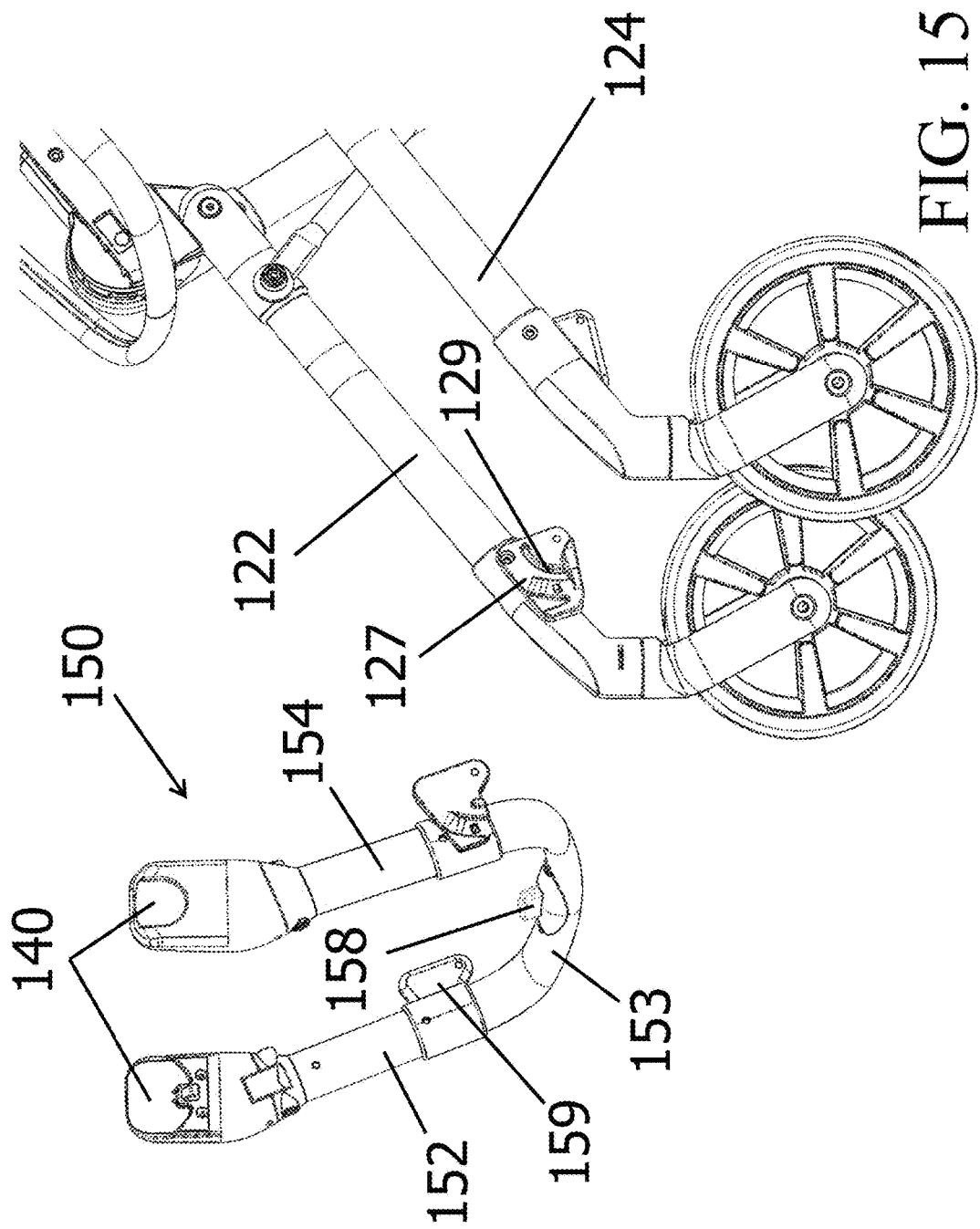
FIG. 15 is a partially exploded perspective view of the lower forward portion of the stroller of FIG. 1 illustrating the lower extension apart from the lower frame portion of the stroller.

FIG. 15 and FIG. 16 illustrate the mechanisms that may effectuate movement of the lower extension 150 relative to the lower frame portion 120. For purposes of clarity, only the workings of the first side strut 122 of the lower frame portion 120 and of the first support member 152 of the lower extension 150 attached thereto are labeled or described. However, it is to be understood that each of the first and second side struts 122, 124 of the lower frame portion may be similarly designed. Likewise, it is to be understood that each of the first and second support members 152, 154 may be similarly designed. Further yet, it is to be understood that each of the secondary connector components 140 may be similarly designed.

Each side strut of the lower frame portion 110 may include a rotational mechanism 127 attached thereto. The lower extension 150 may be designed so as to cooperatively engage with the rotational mechanisms 127. In particular, the lower extension 150 may be adapted for rotational movement relative to the rotational mechanism 127. Each rotational mechanism 127 may include a slotted groove 129.

As the lower extension 150 is rotated relative to the lower frame portion 120, engagement mechanisms 159 attached to the lower extension 150 may cooperatively engage with the grooves 129 in the rotational mechanisms 127. In this way, the engagement mechanisms 159 of the lower extension 150 may selectively position and lock the lower extension 150 into one of the folded and unfolded positions. For example, to rotate the lower extension from the folded position to the unfolded position, downward force (i.e., in the direction of arrow 40) on the crossbar 153 of the lower extension 130 may effect movement of the lower extension 150 and cause the lower extension 150 to rotate upwardly (i.e., in the direction of arrow 30) to the unfolded position. Similarly, to rotate the lower extension back into the folded position, upward force (i.e., in the direction of arrow 30) on the crossbar 153 of the lower extension 130 may effect movement of the lower extension 150 and cause the lower extension 150 to rotate downwardly (i.e., in the direction of arrow 40) to the folded position.

A button 158 may be provided on the lower extension 150. The button 158 may, for example, be adapted to permit rotation of the lower extension 150 relative to the lower frame portion 120. The button 158 may be cooperatively connected to the engagement tab 159. For example, downward compressive force on the button 158 may be adapted to cause the lower extension 150 to be permitted to rotate.

While particular exemplary embodiments have been described, it is not intended that the claims be limited thereto, as it is intended that the claims be as broad in scope as the art will allow and that the specification be read likewise. That is, the foregoing description of specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components may be scaled up or down as required for specific purposes. The claims hereof are intended to encompass all such equivalent components, method steps and scales.

What is claimed is:

1. A stroller, comprising:
   an upper frame portion including first and second side struts spaced apart from each other;
   a lower frame portion including first and second side struts spaced apart from each other;
   a pair of primary connector components adapted to support an associated primary seat in selectively releasable attachment therewith, each of the primary connector components attached to and slidable along the upper frame portion; and
   a lower extension including a pair of secondary connector components adapted to support an associated secondary seat in selectively releasable attachment therewith, the lower extension rotatably attached to the lower frame portion.

2. The stroller of claim 1, wherein the first side strut of the upper frame portion is foldably connected to the first side strut of the lower frame portion and the second side strut of the upper frame portion is foldably connected to the second side strut of the lower frame portion.

3. The stroller of claim 1, wherein each of the primary connector components is non-releasably attached to the upper frame portion.

4. The stroller of claim 1, wherein the lower extension is non-releasably attached to the lower frame portion.

5. The stroller of claim 1, wherein a first one of the primary connector components is attached to and slidable along the first side strut of the upper frame portion and a second one of the primary connector components is attached to and slidable along the second side strut of the upper frame portion.

6. The stroller of claim 1, wherein the lower extension includes first and second support members spaced apart from each other, the first support member rotataby attached to the first side strut of the lower frame portion and the second support member rotatably attached to the second side strut of the lower frame portion.

7. The stroller of claim 6, wherein a first one of the secondary connector components is located at a distal end of the first support member and a second one of the secondary connector components is located at a distal end of the second support member.

8. The stroller of claim 1, wherein the primary connector components are positioned at least partially above and at least partially rearward of the secondary connector components.

9. The stroller of claim 1, wherein the primary connector components are slidable along the upper frame portion between an uppermost position and a lowermost position to selectively vary a distance between the primary connector components and the secondary connector components.

10. The stroller of claim 9, wherein the primary connector components are located proximate a forward end of the upper frame portion when in the lowermost position and are located between the forward end and a rear end of the upper frame portion when in the uppermost position.

11. A modular stroller selectively configurable between a single seat configuration and a tandem seat configuration, the stroller comprising:
an upper frame portion;
a lower frame portion;
at least one primary connector component adapted to slide along the upper frame portion between a lowermost position in the single seat configuration and an uppermost position in the tandem seat configuration; and
a lower extension including at least one secondary connector component, the lower extension adapted to rotate between a folded position in which the lower extension lies directly adjacent and substantially parallel to the lower frame portion and an unfolded position in which the lower extension is angled relative to the lower frame portion and the at least one secondary connector components is oriented upwardly.

12. The stroller of claim 11, wherein the at least one primary connector component is adapted to support an associated primary seat in selectively releasable attachment therewith.

13. The stroller of claim 11, wherein the at least one secondary connector component is adapted to support an associated secondary seat in selectively releasable attachment therewith.

14. The stroller of claim 11, wherein the at least one primary connector component is slidably and non-releasably attached to the upper frame portion.

15. The stroller of claim 11, wherein the lower extension is rotatably and non-releasably attached to the lower frame portion.

16. The stroller of claim 11, wherein the at least one secondary connector component is located at a distal end of the lower extension.

17. The stroller of claim 11, wherein the at least one primary connector component is positioned at least partially above and at least partially rearward of the at least one secondary connector component.

18. The stroller of claim 11, wherein the at least one primary connector component is located proximate a forward end of the upper frame portion when in the lowermost position and is located between the forward end and a rear end of the upper frame portion when in the uppermost position.

19. A stroller system comprising:
a primary seat;
a secondary seat; and
a stroller, the stroller comprising:
an upper frame portion including first and second side struts spaced apart from each other;
a lower frame portion including first and second side struts spaced apart from each other;
a pair of primary connector components adapted to support the primary seat in selectively releasable attachment therewith, the primary connector components attached to and slidable along the upper frame portion; and
a lower extension including a pair of secondary connector components adapted to support the secondary seat in selectively releasable attachment therewith, the lower extension rotatably attached to the lower frame portion.

20. The stroller system of claim 19, wherein sliding movement of the primary connector components along the upper frame portion is retarded when the primary seat is selectively attached to the primary connector components.

* * * * *